(12) United States Patent
Cleevely (10) Patent No.: US 7,306,108 B2
(45) Date of Patent: Dec. 11, 2007

(54) CLOSURE WITH VENTS FOR VENTING DURING MOLDING OF A LINER, METHOD OF FORMING A LINER IN A CLOSURE, AND DEVICE FOR FORMING A LINER IN A CLOSURE

(75) Inventor: Bruce Cleevely, Middletown, PA (US)

(73) Assignee: Berry Plastics Corporation, Evansville, IN (US)

( * ) Notice: Subject to any disclaimer, the term of this patent is extended or adjusted under 35 U.S.C. 154(b) by 534 days.

(21) Appl. No.: 10/824,210

(22) Filed: Apr. 13, 2004

(65) Prior Publication Data

US 2005/0224447 A1 Oct. 13, 2005

(51) Int. Cl.
*B65D 41/34* (2006.01)
*B65D 51/16* (2006.01)
*B65D 41/04* (2006.01)

(52) U.S. Cl. .................. 215/307; 215/252; 215/341

(58) Field of Classification Search ............ 215/252, 215/307, 341, 343–345
See application file for complete search history.

(56) References Cited

U.S. PATENT DOCUMENTS

| | | | |
|---|---|---|---|
| 1,468,748 A * | 9/1923 | Schuman | 206/516 |
| 1,486,937 A | 3/1924 | Taliaferro | |
| 1,956,012 A | 4/1934 | Egan | |
| 2,131,319 A | 9/1938 | Greenholtz et al. | |
| 2,684,774 A | 7/1954 | Aichele | |
| 2,688,776 A | 9/1954 | Evans et al. | |
| 2,823,422 A | 2/1958 | Schneider | |
| 2,835,926 A | 5/1958 | Maier et al. | |
| 2,840,858 A | 7/1958 | Rainer et al. | |
| 2,881,480 A | 4/1959 | Waters | |
| 2,963,738 A | 12/1960 | Brandes et al. | |
| 3,366,723 A | 1/1968 | Green | |
| 3,493,995 A | 2/1970 | Green | |
| 3,536,224 A | 10/1970 | Green | |
| 3,616,954 A | 11/1971 | Peck | |
| 3,674,393 A | 7/1972 | Busi | |
| 3,741,411 A * | 6/1973 | Peacock | 206/593 |
| 3,827,843 A | 8/1974 | Blouch | |

(Continued)

FOREIGN PATENT DOCUMENTS

GB 1112023 5/1968

(Continued)

*Primary Examiner*—Anthony D. Stashick
*Assistant Examiner*—Niki M. Eloshway
(74) *Attorney, Agent, or Firm*—Barnes & Thornburg LLP (57) ABSTRACT

A closure device includes a top wall, a skirt depending from the top wall, and a plurality of pads arranged circumferentially on the top wall, the pads extending into a space formed by the top wall and the skirt, the spaced pads configured to vent gas between adjacent pairs of pads during molding of a liner material against the top wall. A method of forming a liner in a closure device includes applying a moldable material to a top wall of the closure device, engaging a face of a punch of a liner-molding device with pads arranged on the top wall, the pads extending into a space formed by the top wall and a skirt depending from the top wall, compressing the moldable material by the punch against the top wall to form the liner, and venting gas between adjacent pairs of pads during the compressing step.

17 Claims, 6 Drawing Sheets

U.S. PATENT DOCUMENTS

| | | | | |
|---|---|---|---|---|
| 3,958,910 | A | 5/1976 | Wilde | |
| 3,959,061 | A | 5/1976 | Renck et al. | |
| 4,088,730 | A | 5/1978 | Wilde | |
| 4,274,822 | A | 6/1981 | Tamai et al. | |
| 4,280,864 | A | 7/1981 | Bromberg | |
| 4,316,281 | A * | 2/1982 | Prusak | 369/272.1 |
| 4,331,249 | A | 5/1982 | Banich, Sr. | |
| 4,388,058 | A | 6/1983 | Kubo | |
| 4,412,797 | A | 11/1983 | Murayama | |
| 4,899,880 | A * | 2/1990 | Carter | 206/448 |
| 4,984,703 | A | 1/1991 | Burzynski | |
| 5,009,324 | A * | 4/1991 | Ochs | 215/276 |
| 5,190,769 | A | 3/1993 | Murayama | |
| 5,259,745 | A | 11/1993 | Murayama | |
| 5,332,381 | A | 7/1994 | Shapcott | |
| 5,451,360 | A | 9/1995 | Ingram | |
| 5,462,187 | A | 10/1995 | Gregory et al. | |
| 5,554,327 | A | 9/1996 | Ingram et al. | |
| 5,658,518 | A | 8/1997 | Ingram | |
| 5,800,764 | A | 9/1998 | Smeyak et al. | |
| 5,947,311 | A | 9/1999 | Gregory | |
| 5,980,806 | A | 11/1999 | Ohmi et al. | |
| 6,103,170 | A | 8/2000 | Gregory | |
| 6,142,325 | A * | 11/2000 | Chomik | 215/343 |
| 6,306,330 | B1 | 10/2001 | Cerny | |
| 6,371,317 | B1 | 4/2002 | Krueger | |
| 6,399,170 | B1 | 6/2002 | Hock et al. | |
| 6,660,349 | B1 * | 12/2003 | Bourgeois | 428/35.7 |
| 6,964,346 | B1 * | 11/2005 | Taber et al. | 215/352 |
| 7,097,790 | B2 * | 8/2006 | Jochem | 264/40.4 |
| 2001/0013671 | A1 | 8/2001 | Parrinello | |
| 2002/0100998 | A1 | 8/2002 | Hock et al. | |
| 2002/0104818 | A1 | 8/2002 | Riffer | |

FOREIGN PATENT DOCUMENTS

| | | |
|---|---|---|
| GB | 2 002 063 | 12/1979 |
| GB | 2 108 892 | 5/1983 |
| JP | 53-126067 | 11/1978 |
| JP | 58-142806 | 8/1983 |

* cited by examiner

CLOSURE WITH VENTS FOR VENTING DURING MOLDING OF A LINER, METHOD OF FORMING A LINER IN A CLOSURE, AND DEVICE FOR FORMING A LINER IN A CLOSURE

FIELD OF THE INVENTION

The present invention relates to a method and device for venting gas during molding of a liner in a closure.

BACKGROUND INFORMATION

U.S. Pat. No. 4,274,822 refers to an apparatus for forming seal liners of thermoplastic material within closure cap shells. The apparatus is purported to include a plurality of movable dies each having an inner die and an annular outer die, both of which are movable up and down in relatively slidable relation with each other and arranged so that the inner die takes it lowermost position after the outer die has taken its lowermost position. A downward movement of the outer die is restricted so that a constant clearance may be maintained between its lower end and an internal surface of a cap shell to be worked with, and so that an annular foaming chamber of a constant capacity is formed beneath the lower end of the outer die. A plurality of gas discharging grooves are provided so as to be communicated with the foaming chamber.

U.S. Pat. No. 5,332,381 refers to an apparatus for forming liners of thermoplastic material within closure shells. The apparatus is purported to include a movable die having an inner punch member and an annular outer mold member, both of which are moveable up and down in relatively slidable relation with each other and arranged so that the inner punch takes its lowermost position after the outer mold member has taken its lowermost position. As the inner punch moves into its lowermost position, thermoplastic material is forced through radial grooves so that a thick annular pad portion of seal liner may form beneath the lower end wall of the outer mold member.

U.S. Pat. No. 5,800,764 refers to an external venting method for forming a closure liners, in which venting means are provided by a plurality of venting passages formed in an outer surface of a liner sleeve of a liner-forming assembly when properly positioned within the closure. A liner tip coaxially disposed in the sleeve is advanced to compress a moldable plastic liner-forming material between the closure, the liner tip, and the sleeve, so that gas may vent therefrom to a region external to the sleeve.

SUMMARY

The present invention provides a method and device for forming a liner in a closure, in which a configuration of spaced pads or stand-offs in a top wall of the closure may facilitate venting of air or other gases during compression molding of a liner material against the top wall. Since the spaced pads or stand-offs are configured as part of the closure itself, the liner-molding device used to compress the liner material may be more flexibly designed for use with a wide range of closure configurations, and therefore may need not be re-configured to accommodate varying and/or future closure configurations.

According to an exemplary embodiment of the present invention, a closure having a top wall, a circumferential skirt downwardly extending from the top wall, and an outer band extending from the skirt, includes a series of spaced pads or stand-offs which form unobstructed spaces or gaps to vent gas during compression of a liner-forming material by a liner-molding device. The spaced pads may be arranged to engage an outer punch of the liner-molding device so that gas that would otherwise be trapped between the top wall and the liner-molding device may escape via the spaces between the pads. In this regard, the outer punch of the liner-molding device may have, for example, a flat face.

According to an exemplary method of the present invention, an axially movable inner punch of the liner-molding device is arranged with the inner circumference of the outer punch. During molding of the liner, the outer punch engages the pads formed in the top wall of the closure, an amount of moldable material is applied to the top wall of the closure, and the inner punch is extended to compress and form the liner from the moldable material. During compression of the liner, gas that would otherwise be trapped may be ejected through the gaps formed between the pads.

In accordance with an example embodiment of the present invention, a closure device include a top wall, a skirt depending from the top wall, and a plurality of pads arranged circumferentially on the top wall. The pads extend into a space formed by the top wall and the skirt, and the pads are configured to vent gas between adjacent pairs of pads during molding of a liner-material against the top wall.

The pads may be configured to engage a face of an outer punch of a liner-molding device during compression of the liner material against the top wall by an axially movable inner punch of the liner-molding device. The face of the outer punch may be essentially flat.

The pads may be radially oriented on an inner surface of the top wall, and the inner surface of the top wall may be one of circular, oblong, elliptical, parabolic, spiral, and spherical.

The skirt may include threads configured to interact with a threaded portion of a container neck.

The closure device may include a tamper indicating band arranged on the skirt.

The closure device may be made of one of a rigid and semi-rigid material, e.g., plastic, polypropylene, etc.

The closure device may be constructed as a single piece.

In an example embodiment of the present invention, a method of forming a liner in a closure device, includes applying a moldable material to a top wall of the closure device, engaging a face of a punch of a liner-molding device with pads arranged on the top wall, the pads extending into a space formed by the top wall and a skirt depending from the top wall, compressing the moldable material by the punch against the top wall to form the liner, and venting gas between adjacent pairs of pads during the compressing step. The punch may include a flat face. The moldable material may be compressed in the compressing step against the top wall by extending an axially movable inner punch of the liner-molding device. The method may including forming the closure device, e.g., by molding, e.g., injection molding.

In an example embodiment of the present invention, a closure includes a top wall, a skirt depending from the top wall, and venting means arranged circumferentially on the top wall for venting gas during molding of a liner material against the top wall.

In an example embodiment of the present invention, a device for forming a liner in a closure includes means for applying a moldable material to a top wall of the closure device, means for engaging pads arranged on the top wall, the pads extending into a space formed by the top wall and a skirt depending from the top wall, means for compressing the moldable material against the top wall to form the liner, and means for venting gas between adjacent pairs of pads during the compression of the moldable material against the top wall.

DETAILED DESCRIPTION

Figure 1:
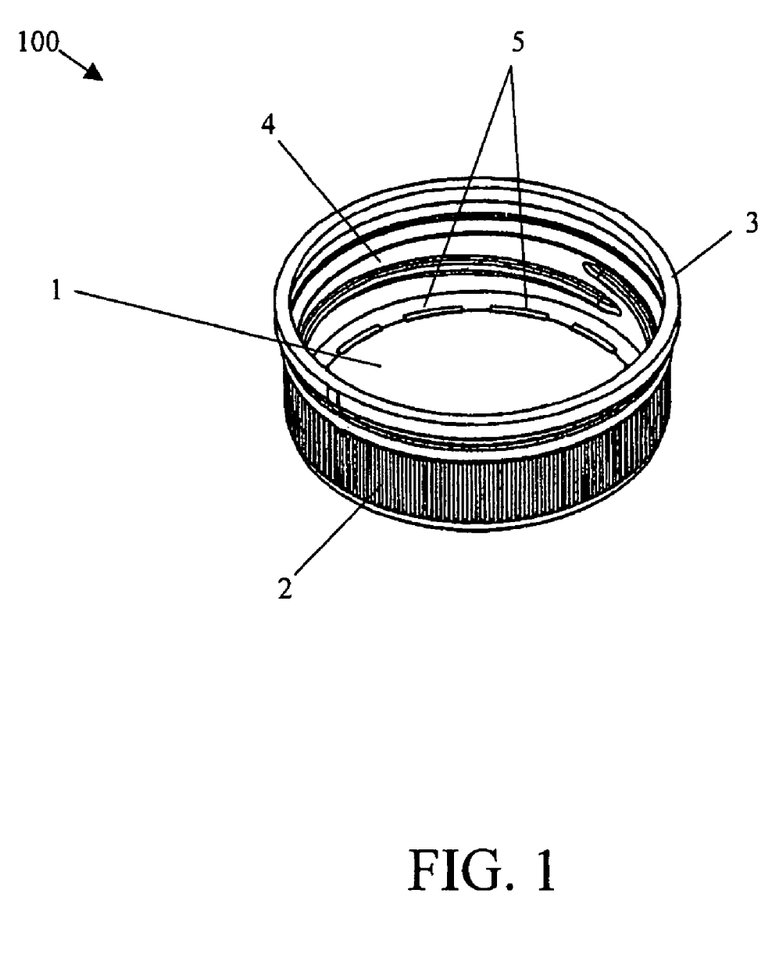
FIG. 1 illustrates a perspective view of a closure according to an exemplary embodiment of the present invention.
Figure 2:
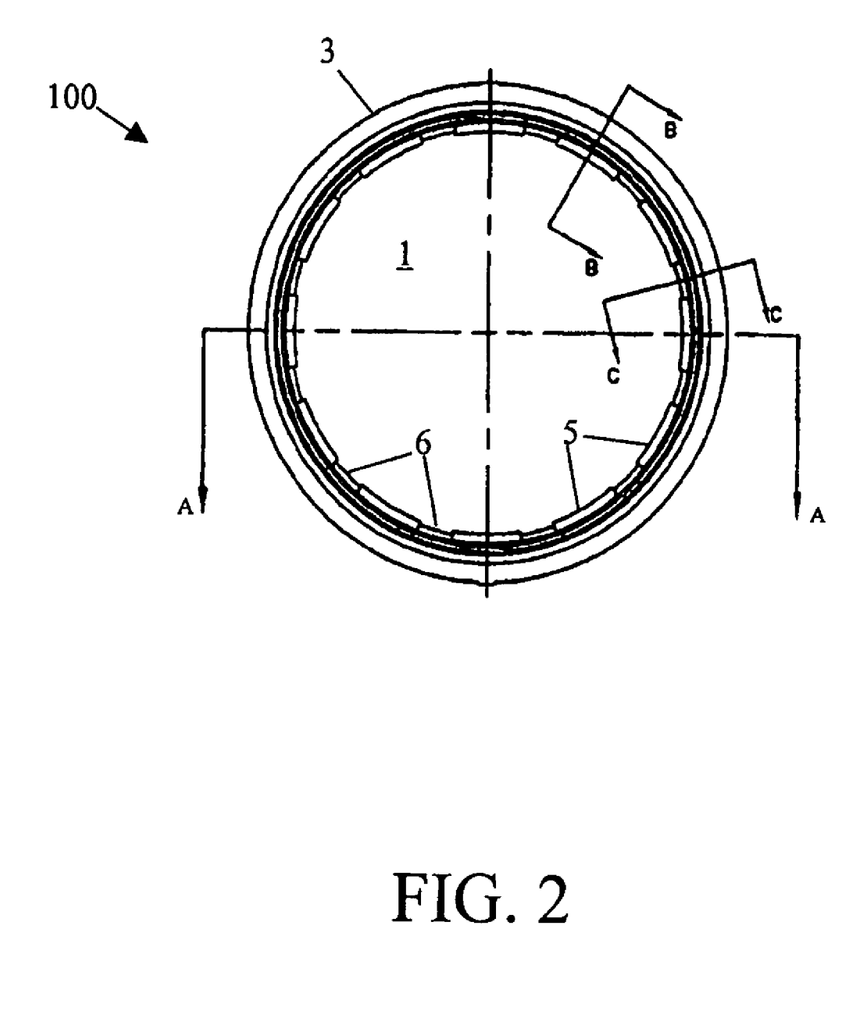
FIG. 2 illustrates a bottom view of the exemplary closure of FIG. 1.

FIGS. 1 and 2 illustrate a closure 100 according to an exemplary embodiment of the present invention. In particular, FIG. 1 illustrates a perspective view of the closure 100, and FIG. 2 illustrates a bottom view of the closure 100.

Closure 100 includes a top wall 1, a skirt portion 2 depending from the top wall and extending downwardly, and an outer band 3 arranged on an outer edge of the skirt portion 2. The top wall 1 includes a series of spaced pads or stand-offs 5 which form gaps 6 that may be used to vent air or other gases during compression of a liner material against the top wall 1. The pads 5 are configured to engage a liner-molding device during compression of a liner material against the inner surface of the top wall 1 so that air or other gases that would otherwise be trapped between the top wall 1 and the liner-molding device may escape via the gaps 6 formed between the pads 5. Accordingly, the liner-molding device need not be specifically configured to accommodate the release of the trapped gas.

The pads 5 are illustrated as arranged radially and evenly spaced around the circumference of the inner surface of the top wall 1. In this regard, the exemplary closure 100 is configured with twelve pads 5, however, more or fewer pads 5 may be provided. Other suitable arrangements, pad spacing, pad location, etc. may also be provided depending the configuration of the particular closure and/or liner-molding device used to compress the liner material. For example, the top wall 1 is illustrated as circular in shape, although any suitable shape may be provided, including, but not limited to, oblong, elliptical, parabolic, spiral, spherical, etc.

The inner sidewall of the skirt portion 2 includes threads 4 which may interact with a threaded portion of a container neck to retain the closure on a container. In this regard, the exemplary closure 100 may be applied, for example, with standard capping equipment to glass bottles or plastic bottles, including those made to standard industry tolerances and government regulations.

The outer band 3 may be configured as a tamper-indicating band to indicate to a consumer, for example, if the container has been opened or otherwise tampered with. In this regard, the outer band 3 may include extending tabs and may be frangibly connected to the skirt portion 2 so that when the closure is removed from a container for the first time, the tabs contact a shoulder of the container and cause the outer band 3 to separate from the skirt portion 2. A tab arrangement and tamper-indicating band, such as that described, for example, in U.S. Pat. No. 6,371,317, which is expressly incorporated herein in its entirety by reference thereto, may be provided.

The exemplary closure 100 may be made of any appropriate rigid or semi-rigid material, including, for example, hard plastic, polypropylene, etc., and may be constructed, for example, in one piece using a single injection molding process. Moreover, the exemplary closure 100 may be suitable for a wide variety of liner materials and/or liner-forming assemblies. For example, the exemplary closure 100 may be suitable for liner-forming assemblies that include flat or smooth faces whose cleanliness and integrity may be more easily maintained, thereby improving overall quality and/or reducing defect rates. The exemplary closure 100 may also be suitable to accommodate future innovations in closure and/or liner-forming assembly design so that such innovations are not unnecessarily restricted or delayed.

Figure 3A:
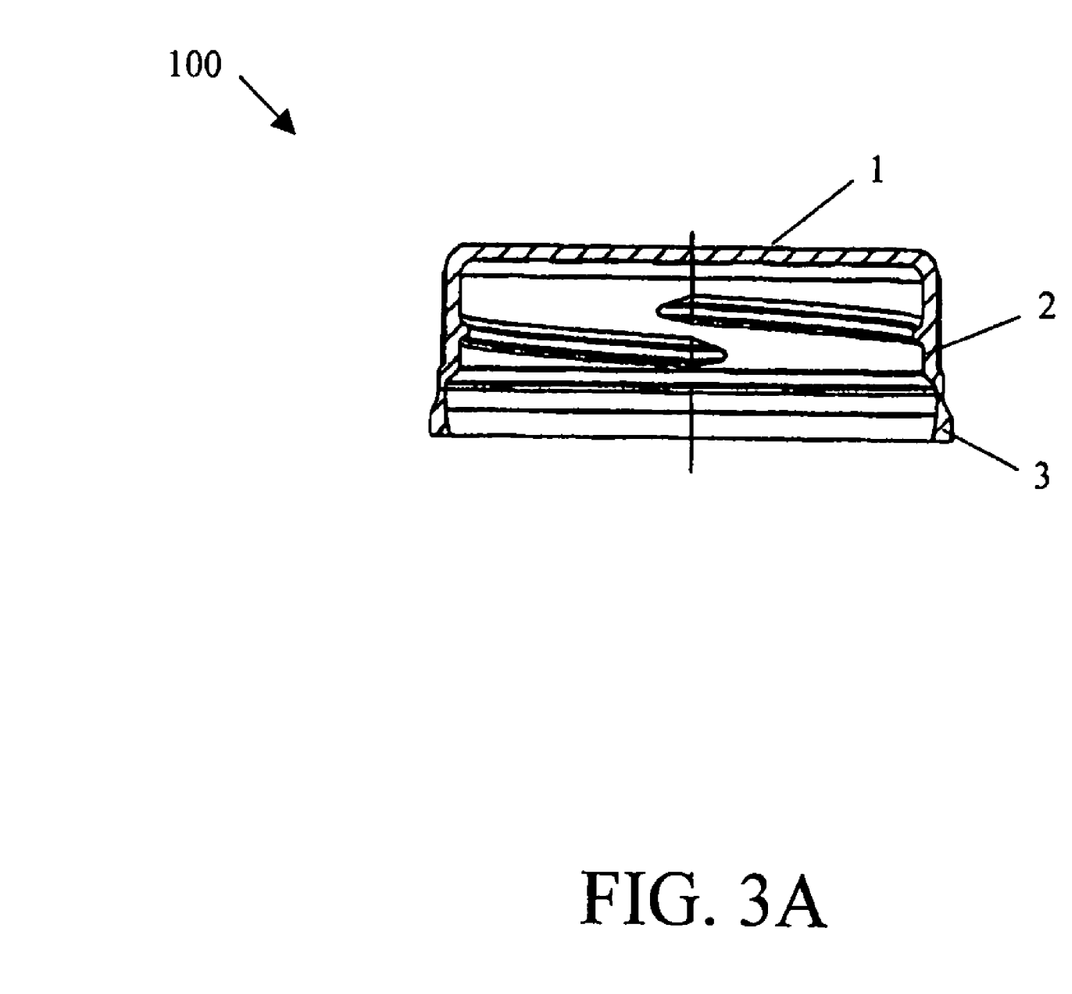
FIG. 3A illustrates a cross-sectional view of the exemplary closure of FIGS. 1 and 2 along designated section A-A in FIG. 2.

FIG. 3A illustrates a cross-sectional view of the exemplary closure 100 of FIGS. 1 and 2 taken along the line A-A in FIG. 2. As illustrated, the arrangement of pads and gaps arranged on the top wall 1 may not interfere with other elements of the exemplary closure 100, including, for example, the skirt portion 2, the outer band 3, and threads 4. In this regard, elements of the exemplary closure 100 may be freely designed to suit other and/or additional requirements. For example, the threads 4 may be freely designed to accommodate a wide variety of container connections.

Figure 3B:
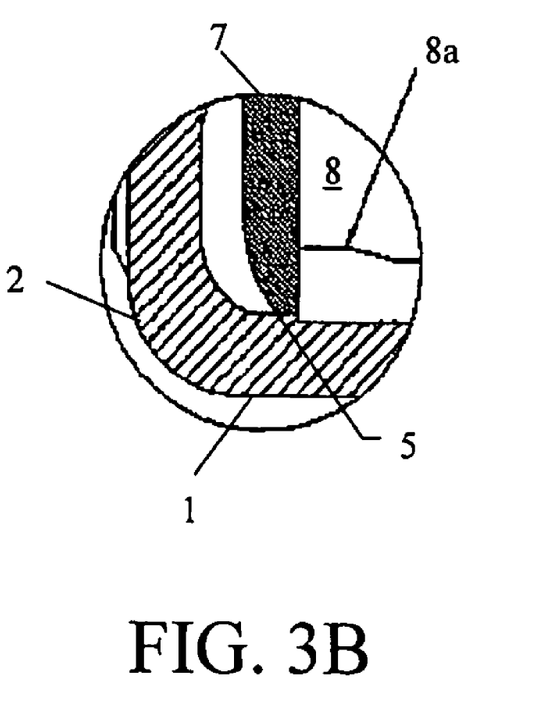
FIG. 3B illustrates a cross-sectional view of the exemplary closure of FIGS. 1 and 2 along designated sections B-B of FIG. 2 during compression of a liner material using a liner-molding device.
Figure 3C:
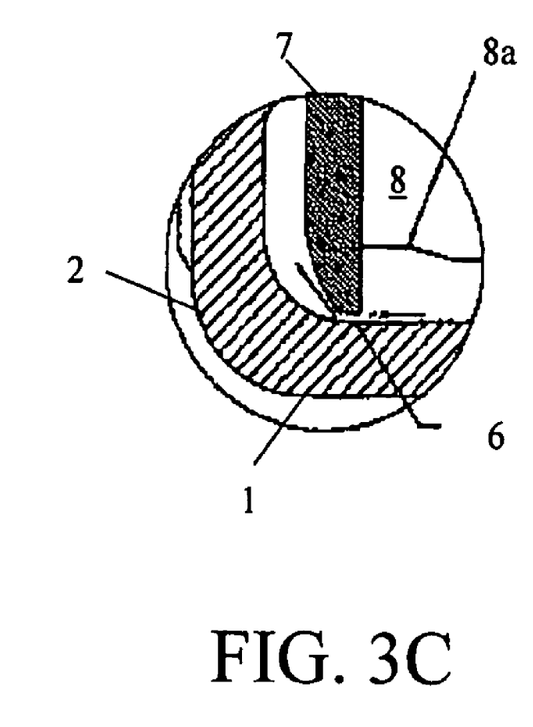
FIG. 3C illustrates a cross-sectional view of the exemplary closure of FIGS. 1 and 2 along designated section C-C of FIG. 2 during compress of a liner material using a liner-molding device.

FIGS. 3B and 3C illustrate cross-sectional views of the exemplary closure 100 of FIGS. 1 and 2 taken along the lines B-B and C-C of FIG. 2 during compression of a liner material using a liner-molding device. In particular, FIG. 3B illustrates a cross-sectional view of the exemplary closure 100 taken along the line B-B, and FIG. 3C illustrates a cross-sectional view of the exemplary closure 100 taken along the line C-C.

As shown, an outer punch 7 of the liner-molding device has a flat face arranged to engage the spaced pads 5 during molding of the liner. An axially movable inner punch 8 of the device is arranged within the inner circumference of the outer punch 7. During molding of the liner, the outer punch 7 engages the pads 5 formed in the top wall 1, an amount of moldable material is applied to the top wall 1, and the inner punch 8 is extended to compress and form the liner from the moldable material. During compression of the liner, gas that would otherwise be trapped between the inner punch surface 8a, the outer punch 7, and the top wall 1, is ejected through gaps 6.

Figure 4:
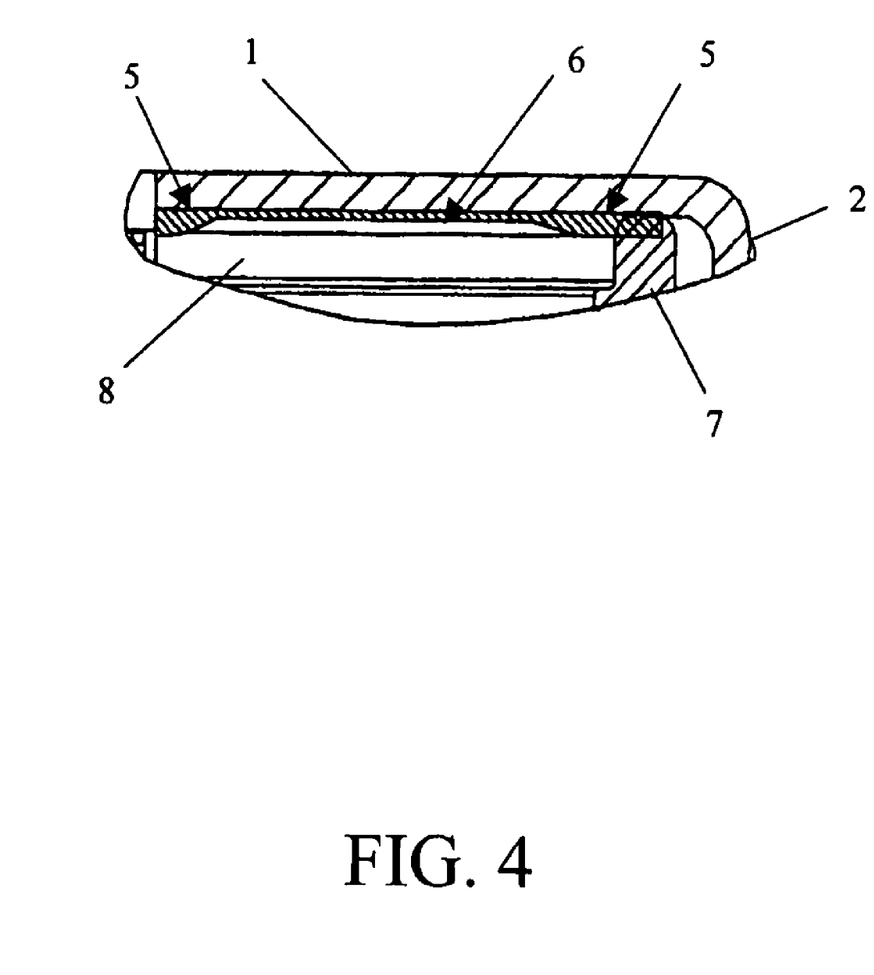
FIG. 4 illustrates a cross-sectional view of the exemplary closure of FIGS. 1 and 2 engaged with a liner-molding device.

FIG. 4 illustrates a cross-sectional view of an exemplary interaction of the closure 100 of FIGS. 1 and 2 and a liner-molding device. A gap 6 formed between spaced pads 5 arranged on the inner surface of the top wall 1 forms a space for gas to escape during compression of a liner material by the liner-molding device. In particular, pads 5 engage the outer punch 7 and/or inner punch 8 of the liner-molding device during compression to allow gas to vent through the gaps 6 that would otherwise be trapped.

Figure 5:
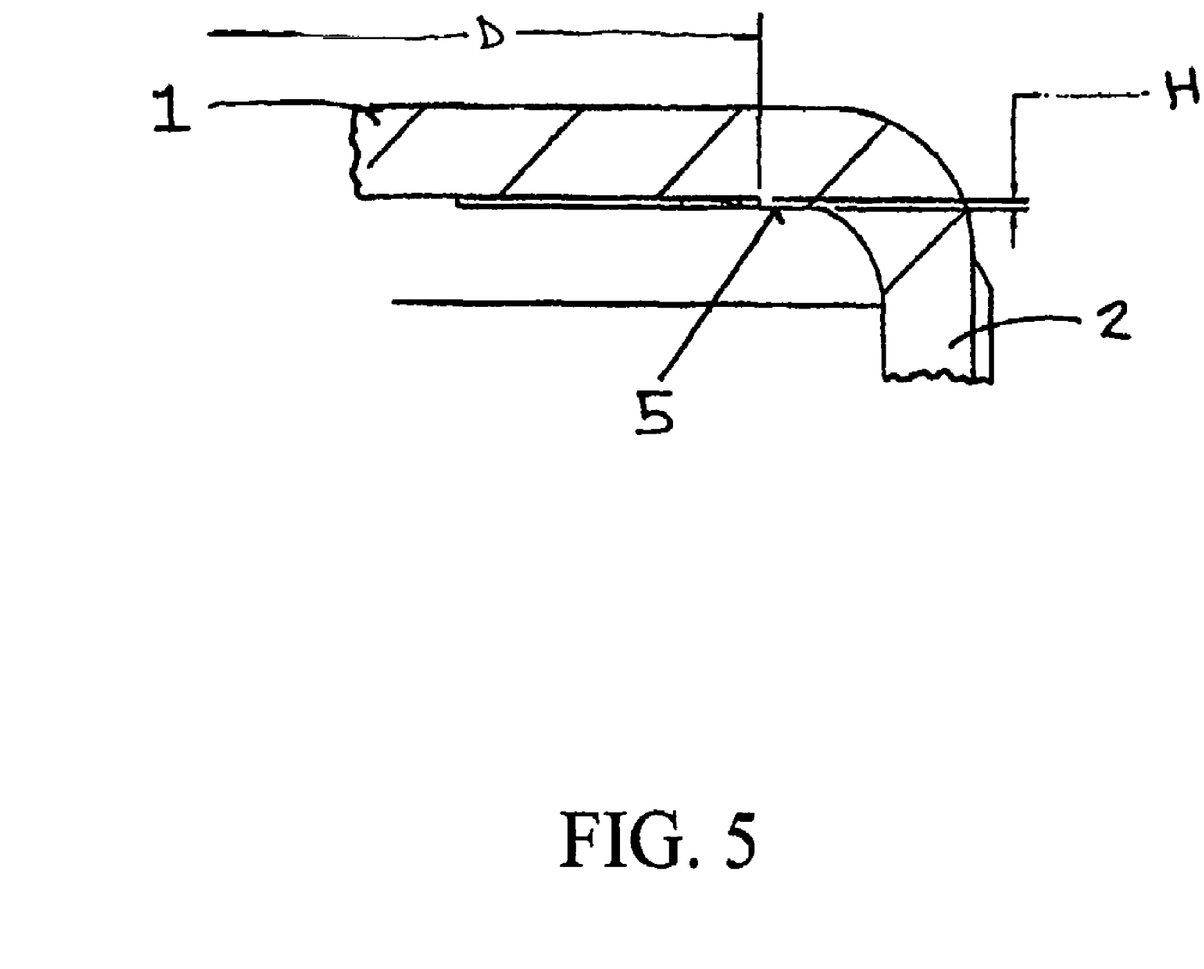
FIG. 5 illustrates an enlarged cross-sectional view of the exemplary closure.

FIG. 5 illustrates an enlarged cross-sectional view of the exemplary closure 100. As illustrated in FIG. 5, the pads 5 have a height H from the top wall 1 and extend a distance D from a central longitudinal axis of closure 100.

What is claimed is:

1. A closure device, comprising:
   a top wall;
   a skirt depending from the top wall, the skirt having an inner wall;
   a plurality of pads arranged circumferentially on the top wall, the pads extending into a space formed by the top wall and the skirt, the space being generally cylindrical with a central axis extending generally parallel to the skirt and generally perpendicular to the top wall, the pads having a first surface extending generally parallel to the axis for abutting an outer edge of a liner and a second surface having a first portion generally perpendicular to the first surface and configured to engage a face of an outer punch of a liner-molding device during compression of the liner material against the top wall by an axially movable inner punch of the liner-molding device and a second portion forming a transition with the inner wall of the skirt, and
   spaces between the pads, the spaces being of a size sufficient to vent gas that would be trapped between the top wall and a liner-molding device during molding of a liner material against the top wall.

2. The closure device of claim 1, wherein the face of the outer punch is essentially flat.

3. The closure device of claim 1, wherein the pads are radially oriented on an inner surface of the top wall.

4. The closure device of claim 3, wherein the inner surface of the top wall is circular.

5. The closure device of claim 1, wherein the skirt includes threads configured to interact with a threaded portion of a container neck.

6. The closure device of claim 1, further comprising a tamper indicating band arranged on the skirt.

7. The closure device of claim 1, wherein the closure device is made of one of a rigid and semi-rigid material.

8. The closure device of claim 7, wherein the material includes plastic.

9. The closure device of claim 7, wherein the material includes polypropylene.

10. The closure device of claim 1, wherein the closure device is constructed as a single piece.

11. The closure device of claim 1, further including a liner abutting the top wall inner surface and the first surface of the pads.

12. The closure device of claim 11, wherein the liner is formed from moldable material.

13. A closure device, comprising:
    a top wall having an inner surface and an outer surface;
    a skirt depending from the top wall, the skirt having an inner surface and an outer surface the top wall inner surface and the skirt inner surface forming a cavity having central axis generally perpendicular to the central portion of the top wall inner surface;
    a plurality of pads arranged circumferentially on the top wall, the pads extending into the cavity; the pads having a first surface extending generally parallel to the axis for abutting an outer edge of a liner and a second surface having a first portion configured to engage a face of an outer punch of a liner-molding device during compression of the liner material against the top wall by an axially movable inner punch of the liner-molding device, the second surface having a first portion and a second portion, the first portion being generally perpendicular to the first surface, and the second portion forming a transition between the first portion and the inner wall of the skirt, and
    spaces between the pads, the spaces being of a size sufficient to vent gas that would be trapped between the top wall and a liner-molding device during molding of a liner material against the top wall.

14. The closure device of claim 13, further including a liner abutting the top wall inner surface and the first surface of the pads.

15. The closure device of claim 14, wherein the liner is formed from moldable material.

16. The closure device of claim 13, wherein the second portion extends from the first portion along a curve of about 90° to the skirt inner surface forming a transition between the first portion and the inner wall of the skirt.

17. The closure device of claim 13, whereby the skirt inner surface is devoid of any protrusion extending over the first surface such that the inner punch can move axially from outside the closure into the closure to contact the first surface.

* * * * *